Figure 1:
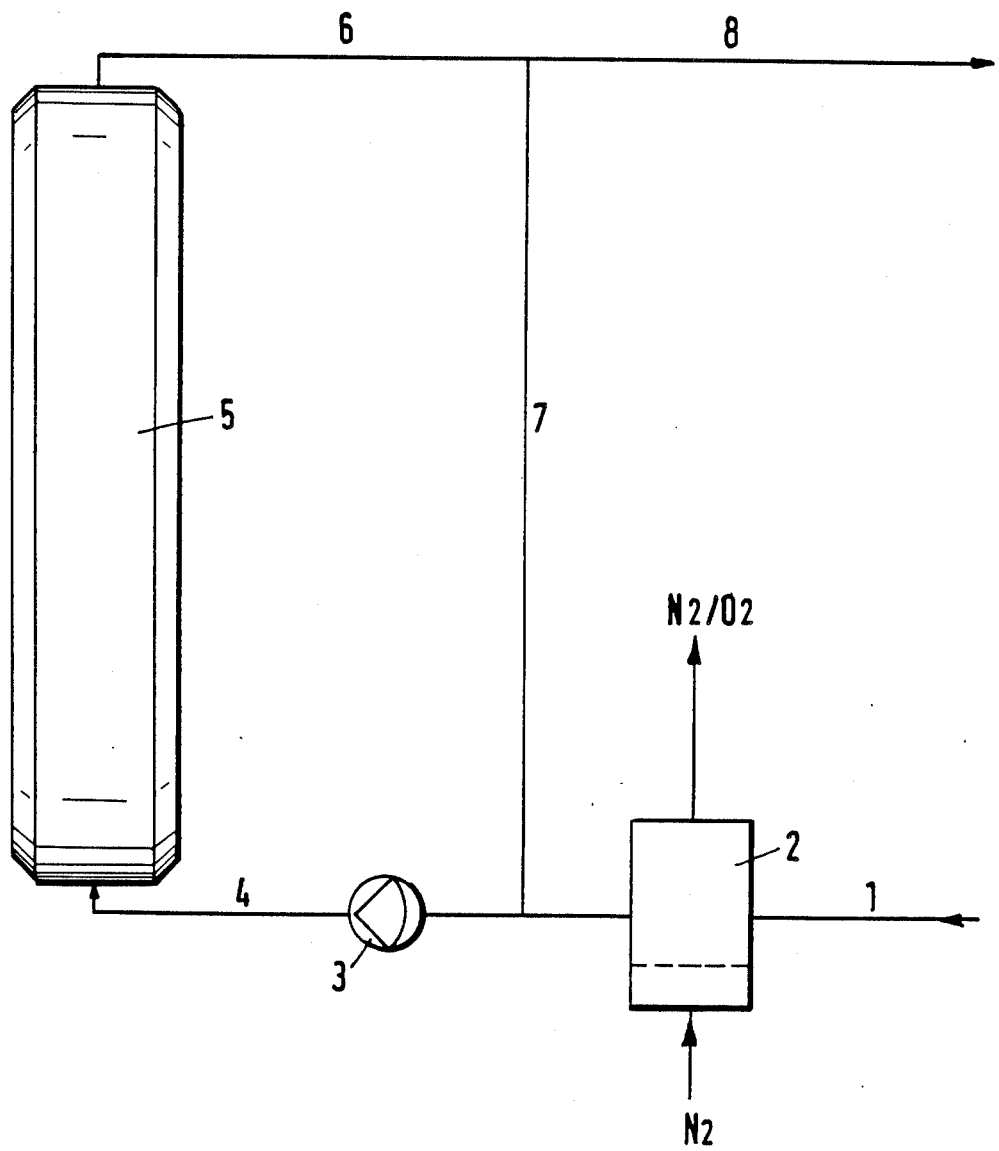

United States Patent [19]

Brandes et al.

[11] Patent Number: 4,705,808
[45] Date of Patent: Nov. 10, 1987

[54] PROCESS FOR TREATING A CORE HALOGENATED STRONGLY ACIDIC CATION EXCHANGE CATALYST

[75] Inventors: Gunter Brandes, Seevetal; Wilhelm Neier; Werner Webers, both of Rheinberg, all of Fed. Rep. of Germany

[73] Assignee: Deutsche Texaco Aktiengesellschaft, Hamburg, Fed. Rep. of Germany

[21] Appl. No.: 844,653

[22] Filed: Mar. 27, 1986

[30] Foreign Application Priority Data

Apr. 6, 1985 [DE] Fed. Rep. of Germany ....... 3512517

[51] Int. Cl.$^4$ ............................. C08F 5/20; C08F 6/00
[52] U.S. Cl. ...................................... 521/30; 528/495; 528/499
[58] Field of Search .................. 526/495, 499; 521/30, 521/28

[56] References Cited

U.S. PATENT DOCUMENTS

| | | | |
|---|---|---|---|
| 2,718,489 | 9/1955 | Coonradt et al. | 521/26 |
| 3,037,052 | 5/1962 | Bortnick et al. | 521/26 |
| 3,808,158 | 4/1974 | Bolto | 521/26 |
| 4,496,667 | 1/1985 | Reichgott et al. | 521/26 |

Primary Examiner—Peter F. Kulkosky
Attorney, Agent, or Firm—Robert A. Kulason; Robert B. Burns; James J. O'Loughlin

[57] ABSTRACT

A process for the treatment of a halogenated strongly acidic cation exchange resin catalyst on a styrene-divinylbenzene copolymerizate base which comprises treating the catalyst with deionized water at a temperature ranging from about 100° to about 150° C. in the absence of oxygen and metal ions is provided.

7 Claims, 1 Drawing Figure

PROCESS FOR TREATING A CORE HALOGENATED STRONGLY ACIDIC CATION EXCHANGE CATALYST

BACKGROUND OF THE INVENTION

This invention relates to a process for the treatment of strongly acidic cation exchange resin catalysts based on styrene/divinyl benzene copolymerizates.

Recently, cation exchange resin catalysts have been employed in processes for the ecologically beneficial implementation of acid-catalyzed syntheses. The syntheses in question are for instance esterifications, splitting of esters, hydrolyses, condensations, hydrations as well as alkylations and acetylations of aromatics. Unlike liquid acids, they have the advantage that the catalyst can be easily separated from the product and that no waste acid mixtures are produced as in the conventional homogeneous catalysis.

A prerequisite for the practical use of a solid cation exchanger instead of a liquid acid is, in addition to sufficient selectivity and space/time yield, the thermal stability of the copolymerizates under the respective reaction conditions.

Strongly acidic styrene/divinyl benzene copolymerizates, the core of which has been substituted with halogen, are particularly thermally stable and are used at temperatures in the range of 100° to 200° C. for acid-catalyzed syntheses, such as for the hydration of lower olefins or for alkylation reactions.

DISCLOSURE STATEMENT

British patent specification No. 1 393 594 discloses the production of cationic exchangers the core of which has been substituted with halogen as well as their use as a thermally stable catalyst for reactions conducted in aqueous media and under anhydrous conditions at temperatures between 100° and 200° C.

In recent years, core-chlorinated and core-fluorinated strongly acidic cation exchangers have been disclosed as catalysts.

U.S. Pat. Nos. 3,256,250 and 4,269,943 disclosed methods for manufacturing core-halogenated, strongly acidic cation exchangers. In general, a styrene/divinyl benzene copolymerizate can be prepared by first sulfonating and subsequently core-chlorinating or core-fluorinating or alternatively, first core-chlorinating or core-brominating and subsequently sulfonating.

Core-halogenated, strongly acidic cation exchangers split off substantial amounts of hydrogen halogenide and sulfuric acid during use. In the hydration of lower olefins having from 3 to 5 carbon atoms to produce the corresponding aliphatic alcohols, such as in the syntheses of isopropyl alcohol and sec. butyl alcohol, large amounts of chlorine and sulfonic acid groups are split off from the chlorinated catalyst in the form of hydrochloric or sulfuric acid. The free acids are strongly corrosive and lead to corrosion, pitting and check crack corrosion of the stainless steel reactors. In addition, the catalyst loses up to 50% of its activity and part of the catalyst matrix is destroyed.

It is the object of this invention to provide a direct hydration process which employs a halogenated, strongly acidic cation exchange resin catalyst which is substantially non-corrosive to process equipment and which is characterized by high durability in the reaction process.

SUMMARY OF THE INVENTION

In accordance with this invention, a strongly acidic cation exchanger the core of which has been substituted with halogen is subjected to pretreatment with deionized water at a temperature in the range of 100° to 150° C. and in the absence of oxygen and metal ions prior to use as a catalyst.

Because the pretreatment is effected at a temperature in the range of about 100° to about 150° C. pressure is employed to maintain the deionized water in the liquid phase.

The catalyst pretreatment process is effected in a vessel that is substantially inert to strong acids. It is important to avoid the presence of iron in the deionized treatment water. Apparatuses lined with enamel, glass, ceramics, Teflon, or other thermally stable plastic material should be used for conducting the catalyst pretreatment process.

It is also important that the deionized water be free from dissolved oxygen.

According to a particularly preferred embodiment, the pretreatment is effected with a solution of one or more alcohols having from 1 through 4 carbon atoms, or more particularly having 3 to 4 carbon atoms, in the deionized water, the alcohol solution conveniently containing 0.5 to 20 vol.%, preferably 1 to 10 vol.% of the alcohol.

It is important to control the severity of the treatment process. Thus, the process should be limited so that the loss of acid, i.e., splitting-off should be less than 25 mg of $H_2SO_4$/liter of catalyst per hour and less than 7 mg of HCl/liter of catalyst per hour.

It was found that washing a core-chlorinated catalyst with demineralized water at 100° to 150° C. under pressure in a stainless steel container, the mechanical stability of the catalyst deteriorated substantially. This was attributed to depolymerization of part of the catalyst. If, however, the catalyst was washed with demineralized water at 100° to 150° C. under pressure for about 400 hours in an enamelled container, the loss of chloride and sulfonic acid groups ($SO_3H^-$) was so low that the core-chlorinated, strongly acidic cation exchanger could be effectively used as a catalyst for the hydration of lower olefins with 3 to 5 carbon atoms to the corresponding alcohols. The loss of a higher amount (approx. 50 mg/l of water) of organic sulfonic acids in the wash water indicated a reduced long-time stability of the catalyst.

It was surprisingly found that when pretreatment is effected in the absence of oxygen and metal ions with demineralized water, and particularly with a solution of $C_3$ or $C_4$ alcohols in the deionized water, the thermal and mechanical stability of a strongly acidic cation exchanger prepared by halogenation and subsequent sulfonation of a styrene/divinyl benzene matrix, or vice versa, is retained for reaction times of 8,000 hours or more. When using a 0.5–20%, preferably a 1–10% aqueous $C_3$ or $C_4$ alcohol, the treatment time was reduced by 50%, as compared to demineralized water alone. In the alcoholic solution, less than 2 mg of aligomeric sulfonic acid fragments per liter were detected.

A core-halogenated, strongly acidic cation exchanger treated in the prescribed way can be used without corrosion problems in conventional stainless steel reactors both in the direct hydration of propene to isopropyl alcohol and in the hydration of n-butenes to sec. butyl alcohol at temperatures of more than 150° C. Additionally, catalyst activity remains substantially unchanged for thousands of hours on-stream in the reactor.

A preferred embodiment for the pretreatment of core-halogenated, strongly acidic cation exchangers is depicted in FIG. 1. In this case, demineralized water or an aqueous-alcohol solution is charged via line 1 into apparatus 2, where it is freed from dissolved oxygen by expulsion with nitrogen and is then transferred via line 4 by means of pump 3 to the treatment container 5. Thereby it is possible both to lead the water or the aqueous alcoholic solution once through treatment container 5 and to discharge it via line 8, and to recycle 80 to 90% through lines 7 and 4 and to phase out from the recycle only 10 to 20% as waste water via line 5. Due to the otherwise high consumption of demineralized water or alcoholic solution, recycling is advantageous.

The following examples illustrate the practice of this invention. To test the catalysts pretreated according to the invention, they were used for the production of isopropyl alcohol (IPA) from propene according to example 9 of German patent specification No. 22 33 967 and for the production of sec. butyl alcohol (SBA) from n-butenes according to example 2 of German patent specification No. 24 29 770.

COMPARISON EXAMPLE

The treatment container depicted in FIG. 1 consisted of a 1.4571 (316 SS) stainless steel tube having a length of 3.0 meters and a diameter of 26 mm. To adjust the temperature the stainless steel tube was provided with a steam jacket. All connecting piping and the pump 3 were made of the same material (316 SS). 1,000 ml of a cation exchanger containing 3.7 mval of sulfonic acid/g of dry substance and 5.5 mval of chlorine/g of dry substance were introduced into this pretreatment apparatus according to FIG. 1.

A feed of 1 l/h of demineralized water yet containing some residual oxygen was pumped via line 1 to the sump of the stainless steel tube. By steam heating the temperature was adjusted to 155° C. At the head of the stainless steel tube the pressure of 10 bar maintained in the tube was released and the water stream containing hydrochloric and sulfuric acid due to hydrolytic splitting-off of the $Cl^1$ and $SO_3H^-$ groups was cooled at 20° C. The hydrochloric and sulfuric acid rates were checked by analysis. The values obtained as milligram per liter of catalyst and hour (mg/l of cat×h) after the respective number of hours have been compiled in Table I.

TABLE I

| after hours | $\dfrac{\text{mg of } H_2SO_4}{\text{l of cat} \times \text{h}}$ | $\dfrac{\text{mg of HCl}}{\text{l of cat} \times \text{h}}$ | $\dfrac{\text{mg of organic sulfonic acid}}{\text{l of cat} \times \text{h}}$ |
|---|---|---|---|
| 4 | 190 | 1,030 | 1,350 |
| 24 | 60 | 175 | 850 |
| 72 | 45 | 80 | 800 |
| 120 | 35 | 29 | 580 |
| 240 | 29 | 12 | 550 |
| 360 | 21 | 6 | 530 |

When removing the catalyst from the pretreatment apparatus it was found that about 20% of the catalyst had turned into a brown, limpid product resembling frog spawn.

When examining the undestroyed catalyst portion a 28% loading of the residual capacity was found. Moreover, the mechanical stability of the undestroyed catalyst portion was considerably impaired. When using this catalyst for the synthesis of IPA by direct hydration of propene it reached only about 50% of the expected efficiency.

EXAMPLE 1

The experiment described in the comparison example was carried out under the same conditions except that an apparatus was used the treatment container 5 of which consisted of a 3-meter-long tube with jacket and enamel lining and that the connecting piping and the pump were made of Teflon.

The hydrochloric and sulfuric acid splitting-off rates have been compiled in Table II.

TABLE II

| after hours | $\dfrac{\text{mg of } H_2SO_4}{\text{l of cat} \times \text{h}}$ | $\dfrac{\text{mg of HCl}}{\text{l of cat} \times \text{h}}$ | $\dfrac{\text{mg of organic sulfonic acid}}{\text{l of cat} \times \text{h}}$ |
|---|---|---|---|
| 4 | 185 | 1,010 | 68 |
| 24 | 61 | 174 | 45 |
| 72 | 44 | 78 | 38 |
| 120 | 36 | 29 | 38 |
| 240 | 28 | 13 | 35 |
| 360 | 20 | 6 | 29 |

The catalyst removed from the pretreatment step was in relatively good condition. However, when it was employed for the synthesis of SBA by direct hydration of n-butenes in very extended test runs, it was found that the mechanical stability had been impaired and the catalyst reached only about 85% of the expected efficiency.

EXAMPLE 2

The run described in Example 1 was repeated with the added condition that prior to entry into the treatment container the stream of demineralized water was freed from dissolved oxygen by percolating nitrogen through a frit. The following splitting-off rates were obtained:

TABLE III

| after hours | $\dfrac{\text{mg of } H_2SO_4}{\text{l of cat} \times \text{h}}$ | $\dfrac{\text{mg of HCl}}{\text{l of cat} \times \text{h}}$ | $\dfrac{\text{mg of organic sulfonic acid}}{\text{l of cat} \times \text{h}}$ |
|---|---|---|---|
| 4 | 188 | 1,015 | 2.0 |
| 24 | 60 | 171 | 1.5 |
| 72 | 41 | 80 | 1.2 |
| 120 | 35 | 30 | 1.3 |
| 240 | 28 | 12 | 1.0 |
| 360 | 19 | 5 | 1.0 |

The catalyst treated in this way was found to be in excellent condition and in the synthesis of SBA by direct hydration of n-butenes in extended test runs of over 8,000 hours no significant impairment of the mechanical stability was exhibited.

EXAMPLE 3

Example 2 was repeated with the variation that instead of using water freed from dissolved oxygen, an aqueous solution containing 10% isopropyl alcohol and subjected to the same treatment was used. Under the same treating conditions, the treatment time was shortened by one-half to 180 hours. The properties and activity of the treated catalyst corresponded to those of the catalyst from Example 2, as ascertained when using this catalyst for the synthesis of SBA.

EXAMPLE 4

Example 2 was repeated with the variation that instead of water freed from dissolved oxygen, an aqueous solution containing 1% SBA and subjected to the same treatment was used. After 180 hours, the sulfuric and hydrochloric acid losses caused by hydrolytic splitting-off reached 22 mg of $H_2SO_4/l$ of cat x h and 6 mg of HCl/l of cat x h, respectively. The amount of sulfonic acid fragments produced in the solution (organic sulfonic acids) was less than 2 mg/l of cat x h. When this catalyst was used in the SBA synthesis process the catalyst retained the good properties observed in the catalyst in Example 3.

EXAMPLE 5

Example 4 was repeated with the variation that the treatment was performed with the same solution and with 1% SBA starting at 100° C. and then raising the solution temperature to 155° C. Moreover, to minimize the aqueous solution formed, 90% of the solution was recycled and only 10% was phased out. The following splitting-off rates were obtained:

| after hours | mg of $H_2SO_4$ / l of cat × h | mg of HCl / l of cat × h | mg of org sulfonic acids / l of cat × h | Temp., °C. |
|---|---|---|---|---|
| 4 | 54 | 302 | 1.5 | 110 |
| 24 | 35 | 95 | 1.1 | 120 |
| 72 | 38 | 71 | 1.2 | 148 |
| 100 | 37 | 62 | 1.4 | 155 |
| 120 | 34 | 40 | 1.4 | 155 |
| 160 | 29 | 17 | 1.2 | 155 |
| 200 | 22 | 9 | 1.0 | 155 |
| 210 | 21 | 6 | 1.1 | 155 |

With respect to its properties and activity, the catalyst treated in the method described was comparable to the catalysts in the Examples 3 and 4, as demonstrated both in the synthesis of IPA and SBA, by the direct hydration of the corresponding olefins.

As a result of the substantially reduced loss of sulfonic acid in the use of the treated catalyst brought about by the prescribed novel treatment process, substantially extended process runs for the production of aliphatic alcohols from olefins in a direct hydration process can be realized.

We claim:

1. A process for the pretreatment of a core halogenated and sulfonated strongly acidic cation exchange styrene-divinyl benzene resin catalyst which comprises treating said catalyst with deionized water maintained in the liquid phase and at a temperature in the range of 100° to about 150° C., said treatment being conducted in the absence of oxygen and metal ions.

2. A process according to claim 1 in which said deionized water has been freed from dissolved oxygen.

3. A process according to claim 1 in which an aliphatic alcohol having from 1 to 4 carbon atoms has been added to said deionized water.

4. A process according to claim 3 in which the alcohol added to said deionized water has from 3 to 4 carbon atoms.

5. A process according to claim 4 in which the aliphatic alcohol added to said deionized water is employed at a concentration ranging from about 0.5 to 20 volume percent of said aqueous alcohol solution.

6. A process according to claim 1 in which the pretreatment severity is limited to splitting off less than 25 mgs. of said sulfonate as sulfuric acid per liter of catalyst per hour and less than 7 mgs. of halogen as a halogen acid per liter of catalyst per hour.

7. A process for the pre-treatment of a core halogenated and sulfonated strongly acidic cation exchange styrene-divinyl benzene resin catalyst which comprises treating said catalyst with deionized water which has been freed from dissolved oxygen and metal ions maintained in the liquid phase at a temperature in the range of 100° to about 150° C. for a period of time effective to limit the loss of acids to less than 25 milligrams of $H_2SO_4$ per liter of catalyst per hour and less than 7 milligrams of HCl per liter of catalyst per hour.

* * * * *